United States Patent [19]

Immink et al.

[11] 4,354,103
[45] Oct. 12, 1982

[54] OPTICAL FOCUSING DEVICE WITH TWO CONTROLS

[75] Inventors: Kornelis A. Immink; Martinus P. M. Bierhoff; Jacobus P. J. Heemskerk, all of Eindhoven, Netherlands

[73] Assignee: U.S. Philips Corporation, New York, N.Y.

[21] Appl. No.: 207,117

[22] Filed: Nov. 17, 1980

[30] Foreign Application Priority Data

Jun. 27, 1980 [NL] Netherlands ............... 8003729

[51] Int. Cl.$^3$ ............................................. G11B 7/08
[52] U.S. Cl. ..................................... 250/201; 369/45
[58] Field of Search ................ 369/45, 46; 250/201, 250/204; 354/25; 356/4

[56] References Cited

U.S. PATENT DOCUMENTS

4,128,847 12/1978 Roullet et al. ............... 369/45

*Primary Examiner*—David C. Nelms
*Assistant Examiner*—Darwin R. Hostetter
*Attorney, Agent, or Firm*—Thomas A. Briody; Robert T. Mayer; Algy Tamoshunas

[57] ABSTRACT

A focusing system for focusing a radiation beam onto an object, in particular an optical disc. The focusing system comprises focusing-error detection means and two control elements for correcting the focusing depending on the detected focusing error. The detection means are constructed so that via one of the two control elements a feedback servo system is obtained while via the other control element a servo system without feedback, i.e. a feed-forward system, is obtained.

4 Claims, 5 Drawing Figures

OPTICAL FOCUSING DEVICE WITH TWO CONTROLS

The invention relates to an optical focusing device, comprising a radiation source, focusing means for focusing the radiation from the radiation source onto an object, detection means for detecting the focusing error and control means, which move the radiation source and/or the focusing means, or at least parts thereof, relative to the object so as to reduce the focusing error, which control means act both on a first part, which can only be moved with a speed smaller than that corresponding to the desired control frequency of the device, and on a second part, which can be moved substantially faster than the first part. Devices of this type are inter alia employed for reading information which is optically coded on an information carrier, such as the systems referred to in the literature as "VLP" and "Compact Disc".

A device of the type mentioned in the opening paragraph is known from the German patent application No. 2,619,232. The advantage of having the control means act on a first, comparatively slowly movable part and a second, comparatively rapidly movable part is that the first part is capable of handling large focus variations, whilst the second part provides the necessary control speed but in general, owing to its lighter construction, can only provide smaller focus variations.

In the known device the control signal generated by the detection means is applied to both the first and the second part so as in a degenerative sense. The invention is based on the recognition that this makes it extremely difficult to obtain a stable control, which moreover has the desired speed and i.e. the desired control frequency. For frequencies of the control signal at which the first part can no longer be moved rapidly enough, a phase shift is produced in the control loop constituted by said detection and control means acting on the first part, which may lead to self oscillation or hunting of the control system. In theory the control acting on the second part tends to eliminate this oscillation tendency, but in practice allowance is to be made for parasitic resonances, whose frequencies would have to be read several times, for example a factor 10× higher than the desired upper frequency of the control system. Therefore, despite a precise mechanical construction, additional phase shifts will be introduced in the control loop comprising the detection means and the control means for the second part, whilst said second part will only produce sufficiently large focus variations, i.e. cover the desired control range, in the case of a high loop gain, so that generally the oscillation tendency is not effectively suppressed. It is then necessary to revert to the inclusion of suitable electrical networks in the control loop, which in general leads to a reduction of the attainable control frequency and thus of the maximum attainable speed of the control system.

The invention is characterized in that the focusing error detection means direct a radiation beam along an optical path which is substantially unaffected by displacements of the second part of the control means, and that the control signal thus generated by said detection means is applied to said first part in the sense of a negative feedback, but to said second part of the control means in the sense of a forward control. The steps in accordance with the invention provide the possibility of designing the control for the first part so that no hunting occurs, whilst the control for the second part is inherently free of oscillations, because this control is a forward control, thereby enabling the necessary amplitude and/or phase correcting networks to be included in the control circuit for said second part without any risk.

The invention will be described in more detail with reference to the drawing, in which FIGS. 2, 3, 4 and 5 represent four different embodiments of the invention. All the examples shown concern apparatus for reading information which is stored on a carrier in an optically coded form, but it will be evident that they are also suitable for the other uses mentioned in the said German patent application No. 2,619,232.

Figure 1:
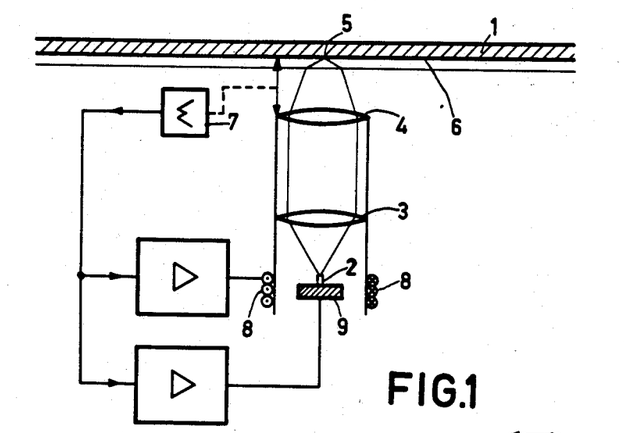
FIG. 1 represents the principle of the known device.

In FIG. 1 a carrier for optically coded information, for example a "VLP" or a "Compact Disc", is designated 1. Said information can be read in known manner by means of a radiation source 2, specifically a laser, whose radiation is focused at the carrier 1 by means of a lens system 3, 4, after which an electrical signal can be derived from the reflected radiation upon detection, which signal corresponds to the information on the carrier 1. Moreover, many methods are known of deriving a signal which is a measure of the focusing error, i.e. the distance between the image point 5 of the source 2, which is imaged onto the carrier 1 by the lens system 3, 4, and the layer 6 on said carrier, which contains the information in optically coded form. The reference numeral 7 schematically represents the detector, which supplies an electrical signal corresponding to the focusing error, the so-termed error signal.

In the device according to the German patent application No. 2,619,232, this error signal (after amplification) is applied to two control elements 8 and 9 in the sense of a negative feedback, of which the one element (8) is only suitable to effect comparatively slow displacements of the image point 5, whereas the other element (9) can provide such fast displacements that the desired upper frequency of the control device can be attained. The control element 8 is schematically represented as an electrodynamic coil, which can move the entire lens system 3, 4 in the direction of the optical axis, whilst the element 9 may be a piezo-electric crystal which is capable of moving the radiation source 2, for example a diode laser, in the direction of the optical axis, however, it will be apparent from the following that other combinations of control elements are also possible.

The devices in accordance with the invention differ from the known device by the special manner in which the error signal is obtained and by the use of said error signal partly in a negative-feedback loop and partly in a forward-control sense.

Figures 2, 5:
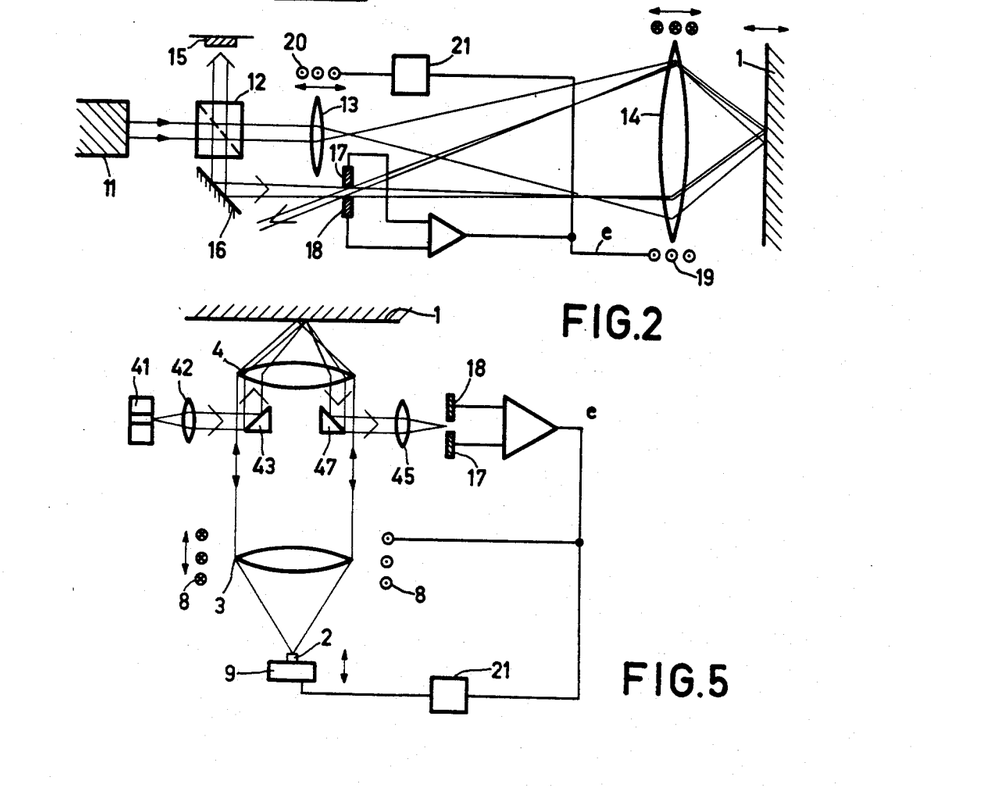

FIG. 2 shows an embodiment of the invention employing a gas-discharge laser, for example a He-Ne laser, as radiation source. Said source 11 projects its light onto the carrier 1 via a beam-splitting prism 12 and a lens system, which comprises a field lens 13 and an objective lens 14, focusing at the information track of said carrier 1 being effected specifically by said objective lens 14. The light which is reflected by the carrier 1 passes through the lenses 14 and 13 and is subsequently deflected in the direction of a photo diode 15 by means of the prism 12, which diode supplies an electrical signal corresponding to the information on the carrier 1.

A part of the light from the source 11 is deflected in the direction of a mirror 16 by the prism 12, after which it is focused onto the carrier 1 by means of the objective lens 14, by-passing the field lens 13, is reflected by said carrier 1 and is subsequently directed towards two photodiodes 17 and 18 via the objective lens 14. These photodiodes 17 and 18 are arranged so that in the case of a correct focusing the two diodes receive equal amounts of light, so that push-pull connection of their electrical output signals yields a zero error signal, whilst in the case of a focusing error, for example because the carrier 1 moves to and fro in the direction of the optical axis, either the diode 17 or the diode 18 will receive more light, so that said push-pull connection provides an error signal e which corresponds to said focusing error.

Like in the known device, said error signal e is applied to a control element 19 in the sense of a negative feedback, by means of which element the objective lens 14 is moved to and fro in the direction of the optical axis in such a way that focusing errors are reduced. Since said objective lens is generally comparatively heavy, said displacement will not be fast enough to obtain the desired high upper frequency of the control system. For this purpose the error signal e is also applied to a control element 20 but now in a forward-control sense, which element is capable of moving the field lens 13 to and fro in the direction of the optical axis. The sign of this control is selected so that residual focusing errors are compensated for, whilst for accurately maintaining the amplitude and phase of the control signal applied to the control element 20 (in order to prevent under-compensation or over-compensation), a network 21 may be included. This forward control is free from any sort of hunting, because the error signal e is independent of displacements of the field lens 13.

Figure 3:
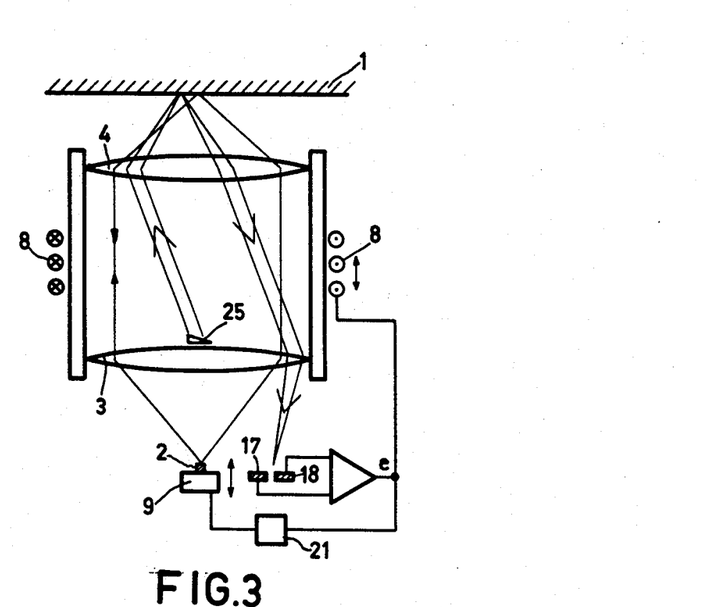

In the embodiment of FIG. 3 use is made of a diode laser 2 as radiation source. By means of the lens system 3, 4, the lens 3 serving as collimator lens and the lens 4 as objective lens, said source 2 is again imaged (focused) on the information carrier 1. The error signal e, which should be a measure of the focusing error, is now obtained by diverting a part of the light emitted by the source 2 from the central portion (i.e. near and around the optical axis), after which said diverted light beam, again via the lens 4, reflection by the carrier 1 and subsequently via the lenses 4 and 3, reaches the photodiodes 17 and 18, whose outputs are connected in push-pull. The error signal e thus obtained is applied to the respective control element 8 (which is capable of moving the entire lens system 3, 4 in the direction of the optical axis) and the control element 9 (which can move the source 2 in the direction of the optical axis). A displacement of the source 2 will lead to a corresponding displacement of its image point (and is therefore suitable as a means of compensating for focusing errors), but the light beam derived by means of the wedge 25 is hardly influenced by such displacements and in the case of a correct focusing the photodiodes 17 and 18 will again receive equal amounts of light regardless of the axial displacement of the source 2. By applying the error signal e to the control element 8 in the sense of a negative feedback but to the control element 9 in a forward-control sense (whilst again the network 21 and, if required, matching amplifiers may be included), it is again possible to obtain a sufficiently fast control, which is free from any hunting tendency.

Figure 4:
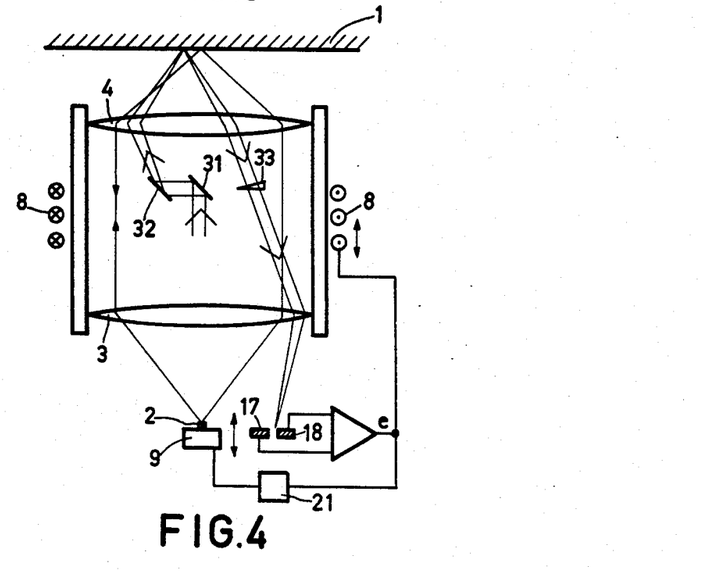

In the variant of FIG. 4 the central portion of the light which is emitted by the source 2 and converted into a parallel beam by the collimator lens 3 is split off by means of a mirror 31 and subsequently directed to the photodiodes 17 and 18 via the mirror 32, the lens 4, the carrier 1, and the lenses 3 and 4, which light path may include a wedge 33. The mirrors 31 and 32, which are constituted by prisms, and the wedge 33 may be mounted on a single glass plate or moulded into a plastics plate. The further construction and the operation of this device is identical to that of FIG. 3.

The variant of FIG. 5 again comprises a diode laser 2, a collimator lens 3 and the objective lens 4. The error signal is now obtained by means of a separate light path, comprising an auxiliary light source 41, for example a light-emitting diode (LED), a lens 42, a prism 43, the objective lens 4, the information carrier 1, the prism 47, the lens 45 and the photodiodes 17 and 18. This error signal is applied to the control element 8, which can move the lenses 3 and 4 to and fro in the direction of the optical axis, in the sense of a negative feedback and to the control element 9, which can move the diode laser 2 accordingly, in a forward-control sense. Since the radiation beam emitted by the source 41 is not influenced by the control element 9, the error signal e which is thus generated is independent of movements of said element 9, so that the forward control to which said element 9 is subject does not give rise to hunting.

What is claimed is:

1. An optical focusing device, comprising a radiation source, focusing means for focusing the radiation from the radiation source onto an object, detection means for detecting the focusing error and control means, which move the radiation source and/or the focusing means, or at least parts thereof, relative to the object so as to reduce the focusing error, which control means act both on a first part, which can be moved with a speed smaller than that corresponding to the desired control frequency of the device, and on a second part, which can be moved substantially faster than the first part, characterized in that the focusing error detection means direct a radiation beam along an optical path, which is substantially unaffected by displacements of the second part of the control means, and that the control signal thus generated by said detection means is applied to said first part in the sense of a negative feedback but to the second part of the control means in the sense of a forward control.

2. A device as claimed in claim 1, characterized in that the focusing means comprise a field lens and an objective lens and that by means of a beam-deflecting means a part of the radiation from the radiation source is directed to a push-pull photodetector via the objective lens and the information, by-passing the field lens, the output signal of said detector controlling the objective lens in the sense of a negative feedback and the field lens in a forward-control sense.

3. A device as claimed in claim 1, using a diode-laser as a radiation source, characterized in that the part of the source radiation around the optical axis of the focusing means is split off and is directed to a push-pull photodetector at least via the information carrier, the output signal on said detector controlling the focussing means in the sense of a negative feedback and the diode in a forward-control sense.

4. A device as claimed in claim 1, characterized in that the focusing error is measured by means of a radiation beam emitted by an auxiliary radiation source, whose path is independent of the displacements of said second part of the control means.

* * * * *

UNITED STATES PATENT AND TRADEMARK OFFICE
CERTIFICATE OF CORRECTION

PATENT NO. : 4,354,103
DATED : October 12, 1982
INVENTOR(S) : KORNELIS A. IMMINK ET AL It is certified that error appears in the above—identified patent and that said Letters Patent is hereby corrected as shown below:

Claim 1, line 4, after "error" insert --, said detection means generating a control signal representative of said error,--; delete ", which";

line 5, change "move" to --for moving--;

line 7, delete "act";

line 8, change "both on" to --has--; after "part" delete "," (comma); change "can be moved" to --moves one of said source, focusing means or parts thereof--;

line 9, change "the" to --a--;

line 10, delete "on"; after "part" delete ","(comma);

UNITED STATES PATENT AND TRADEMARK OFFICE
CERTIFICATE OF CORRECTION

PATENT NO. : 4,354,103
DATED : October 12, 1982
INVENTOR(S) : KORNELIS A. IMMINK ET AL It is certified that error appears in the above—identified patent and that said Letters Patent is hereby corrected as shown below:

Claim 1, line 11, change "can be moved" to --moves another of said source, focusing means or parts thereof--;

line 13, change "direct" to --directs--; after "path" delete "," (comma);

line 14, after "the" insert --element moved by said--;

line 16, delete "thus";

line 17, delete "a"; change "but" to --and--;

line 18, delete "a";

Claim 2, line 2, after "lens" insert --which is moved by said second part--;

UNITED STATES PATENT AND TRADEMARK OFFICE
CERTIFICATE OF CORRECTION

PATENT NO. : 4,354,103
DATED : October 12, 1982
INVENTOR(S) : KORNELIS A. IMMINK ET AL It is certified that error appears in the above—identified patent and that said Letters Patent is hereby corrected as shown below:

Claim 2, line 3, after "lens" insert --which is moved by said first part--; change "by means of a" to --said detection means includes a push-pull photodetector and a--;

line 4, after "means" insert --for directing--;

line 5, change "is directed to a" to --onto said--;

line 6, change "information" to --object--;

line 7, after "detector" insert --defining said control signal for--; after "the" insert --movement of the--;

line 8, after "and" insert --controlling the movement of--;

UNITED STATES PATENT AND TRADEMARK OFFICE
CERTIFICATE OF CORRECTION

PATENT NO. : 4,354,103
DATED : October 12, 1982
INVENTOR(S) : KORNELIS A. IMMINK ET AL It is certified that error appears in the above—identified patent and that said Letters Patent is hereby corrected as shown below:

Claim 3, line 1, change "using" to --wherein said source includes--;

line 2, change "as a radiation source," to --which is moved by said second part and wherein said focusing means is moved by said first part, and--; change "the part" to --said detection means includes a push-pull photodetector and means for splitting off a portion--;

line 3, delete "source";

UNITED STATES PATENT AND TRADEMARK OFFICE
CERTIFICATE OF CORRECTION

PATENT NO. : 4,354,103
DATED : October 12, 1982
INVENTOR(S) : KORNELIS A. IMMINK ET AL It is certified that error appears in the above—identified patent and that said Letters Patent is hereby corrected as shown below:

Claim 3, line 4, change "is split off and is directed" to --and directing said split off portion --. change "a" to --said--;

line 5, change "information carrier" to --object--;

line 6, after "detector" insert --defining said control signal for--; after "the" insert --movement of said--;

line 7, after "the" (last occurrence) insert --movement of the--; change "diode" to --diode-laser--;

UNITED STATES PATENT AND TRADEMARK OFFICE
CERTIFICATE OF CORRECTION

PATENT NO. : 4,354,103

DATED : October 12, 1982

INVENTOR(S) : Kornelis A. Immink et al.

It is certified that error appears in the above-identified patent and that said Letters Patent is hereby corrected as shown below:

Claim 4, line 4, after "of" (last occurrence) insert

-- the element moved by --.

Signed and Sealed this

Third Day of January 1984

[SEAL]

Attest:

GERALD J. MOSSINGHOFF

Attesting Officer    Commissioner of Patents and Trademarks